(12) United States Patent
Park et al.

(10) Patent No.: US 12,722,638 B2
(45) Date of Patent: Sep. 1, 2026

(54) METHOD OF CONTROLLING VEHICLE FOR ONE-PEDAL DRIVING ASSISTANCE

(71) Applicants: Kia Corporation, Seoul (KR); Hyundai Motor Company, Seoul (KR)

(72) Inventors: Jin Rak Park, Hwaseong-si (KR); Jeong Soo Eo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 474 days.

(21) Appl. No.: 18/054,384

(22) Filed: Nov. 10, 2022

(65) Prior Publication Data

US 2024/0001917 A1 Jan. 4, 2024

(30) Foreign Application Priority Data

Jun. 30, 2022 (KR) ........................ 10-2022-0080129

(51) Int. Cl.
*B60W 30/16* (2020.01)
*B60L 15/20* (2006.01)

(52) U.S. Cl.
CPC ............. *B60W 30/16* (2013.01); *B60L 15/20* (2013.01); *B60L 2240/12* (2013.01);
(Continued)

(58) Field of Classification Search
CPC ........... B60W 30/16; B60W 2510/083; B60W 2540/10; B60W 2554/4041; B60W 2720/10; B60W 2754/30; B60W 2754/50; B60W 2554/802; B60W 10/08; B60W 10/20; B60W 40/105; B60W 60/001;
(Continued)

(56) References Cited

U.S. PATENT DOCUMENTS 6,311,121 B1 * 10/2001 Kuragaki ........... B60K 31/0008
340/901
9,845,022 B2 * 12/2017 Komatsu ............. B60L 15/2018
(Continued)

FOREIGN PATENT DOCUMENTS

JP 2006175943 A 7/2006
JP 2007238031 A * 9/2007 ................ B60T 7/22
(Continued)

*Primary Examiner* — Aniss Chad
*Assistant Examiner* — Nikki Marie M Molina
(74) *Attorney, Agent, or Firm* — Slater Matsil, LLP

(57) ABSTRACT

A method of controlling a vehicle for one-pedal driving assistance includes acquiring real-time driving information of a subject vehicle detected by a driving information detection unit and real-time vehicle-ahead information detected by a front detection unit; determining whether the subject vehicle has entered an automatic control inspection section using relative distance information with respect to a vehicle ahead in the acquired real-time vehicle-ahead information; starting an automatic distance control mode upon determining that the subject vehicle has entered the automatic control inspection section; and controlling a relative speed with respect to the vehicle ahead so that a relative distance with respect to the vehicle ahead is allowed to be adjusted to a target relative distance with respect to the vehicle ahead based on the real-time driving information and the real-time vehicle-ahead information during the automatic distance control mode.

20 Claims, 9 Drawing Sheets

0% PEDAL

EXAMPLE OF 10 m
(AUTOMATIC CONTROL INSPECTION SECTION)

EXAMPLE OF 5 m
(TARGET RELATIVE DISTANCE)

WHEN ACCELERATOR PEDAL IS OFF :
(WHEN FOOT IS COMPLETELY TAKEN OFF ACCELERATOR PEDAL BEFORE DESIRED DISTANCE)

ASSIST IN STOPPING VEHICLE AT DESIRED DISTANCE

(52) U.S. Cl.
CPC ..... *B60L 2240/423* (2013.01); *B60L 2250/26* (2013.01); *B60W 2510/083* (2013.01); *B60W 2540/10* (2013.01); *B60W 2554/4041* (2020.02); *B60W 2720/10* (2013.01); *B60W 2754/30* (2020.02); *B60W 2754/50* (2020.02)

(58) Field of Classification Search
CPC ..... B60W 2050/0008; B60W 2520/10; B60W 2520/28; B60W 2540/18; B60W 2710/083; B60L 15/20; B60L 2240/12; B60L 2240/423; B60L 2250/26; B60L 3/0015; B60L 15/2009; B60L 2240/622; Y02T 10/72
See application file for complete search history.

(56) References Cited

U.S. PATENT DOCUMENTS 11,130,403 B1 9/2021 Woodland et al.
2002/0121398 A1* 9/2002 Kikuchi ............. B60K 31/0008 180/170
2007/0255481 A1* 11/2007 Egawa .................. B60W 30/16 701/96
2010/0070151 A1* 3/2010 Sonoda ..................... B60T 7/22 701/96
2015/0224991 A1* 8/2015 Sudou ................... B60W 10/06 701/96
2016/0264003 A1* 9/2016 Yokoyama .......... B60L 15/2009
2017/0001642 A1* 1/2017 Kumai .................. B60W 30/16
2018/0093571 A1* 4/2018 Hall .......................... B60L 7/08
2018/0118034 A1* 5/2018 Zenner .................... F16D 61/00
2018/0319397 A1* 11/2018 Ohta ................... B60W 30/143
2019/0291728 A1* 9/2019 Shalev-Shwartz ........................... B60W 30/0956
2021/0221371 A1* 7/2021 Hayashi ................ B60W 10/06
2022/0289192 A1* 9/2022 Akahane ............... B60W 30/12
2023/0219587 A1* 7/2023 Helmer ........... B60W 30/18018 701/1
2023/0294719 A1* 9/2023 Niu ........................ G06V 20/58 74/513

FOREIGN PATENT DOCUMENTS

JP 2020059367 A 4/2020
JP 2020100349 A 7/2020
KR 101558772 B1 10/2015

* cited by examiner

METHOD OF CONTROLLING VEHICLE FOR ONE-PEDAL DRIVING ASSISTANCE

CROSS-REFERENCE TO RELATED APPLICATIONS

This application claims, under 35 U.S.C. § 119(a), the benefit of and priority from Korean Patent Application No. 10-2022-0080129, filed on Jun. 30, 2022, the entire contents of which are incorporated herein by reference.

TECHNICAL FIELD

The present disclosure relates to a method of controlling a vehicle for one-pedal driving assistance. More particularly, it relates to a method of controlling a vehicle capable of improving convenience of one-pedal driving using a sensor in an electrified vehicle.

BACKGROUND

In an electrified vehicle driven by a motor, a regenerative braking mode is performed to charge a battery by recovering vehicle kinetic energy as electric energy through motor power generation during coasting or braking. In the electrified vehicle, a function of the regenerative braking mode is essential to increase vehicle efficiency and improve fuel efficiency.

In the regenerative braking mode of the electrified vehicle, the motor may generate negative (−) torque, and thus may be used as an electric braking device (regenerative braking device) to decelerate the vehicle by replacing a hydraulic braking device (friction braking device).

Due to these characteristics, recently, attempts have been made to apply one-pedal driving technology that minimizes the use of hydraulic braking in the electrified vehicle and enables acceleration/deceleration driving by using only the motor. One-pedal driving technology refers to technology that accelerates and decelerates a vehicle using only one pedal (accelerator pedal), and is representative technology of the electrified vehicle.

Due to the rapidly increasing number of elderly drivers in recent years, a frequency of maloperation of accelerator and brake pedals and resulting accidents are increasing. Accordingly, demand for a new pedal system, such as a one-pedal system, has been increasing.

One-pedal driving may be applied to an electric vehicle in a broad sense, that is, an electrified vehicle such as a hybrid electric vehicle (HEV), a pure electric vehicle (EV), or a fuel cell electric vehicle (FCEV). These vehicles have a common feature in that each of the vehicles may be driven by a motor and may perform regenerative braking.

In the electrified vehicle, unlike a vehicle equipped with only an internal combustion engine, regenerative braking that generates braking force, which is force in a vehicle deceleration direction, is possible using a motor. Thus, it is possible to accelerate and decelerate the vehicle using only one pedal (accelerator pedal).

Meanwhile, recently, research on sensors mounted in intelligent vehicles has been actively conducted. For example, a camera, an infrared sensor, a RAdio Detecting and Ranging (RADAR) sensor, an ultrasonic sensor, a GPS sensor (GPS receiver), a light detection and ranging (LiDAR) sensor, a gyroscope, etc. are being used in the intelligent vehicles.

Among these devices and sensors, front sensors such as radar and ultrasonic sensors measure a distance to a vehicle in front (vehicle ahead) in real time, and use the measured distance information for smart cruise control.

In addition, as various sensors and electronic devices have been developed, driving support and driving assistance functions capable of assisting vehicle driving and improving driving safety and convenience have been attracting attention.

The use of the sensor may be considered even in a vehicle capable of one-pedal driving, and there is a demand for a method of improving convenience of one-pedal driving by using the sensor in the electrified vehicle.

When an electrified vehicle to which one-pedal driving technology is applied performs one-pedal driving while passing through a congested section, a driver needs to repeatedly depress/release the accelerator pedal to maintain a constant distance from a vehicle ahead.

In particular, since the accelerator pedal needs to be finely adjusted with a small amount of depressing/releasing the pedal, there is inconvenience in that an ankle of the driver is under strain. For this reason, utilization of one-pedal driving of the electrified vehicle is not high in a congested section.

The above information disclosed in this Background section is only for enhancement of understanding of the background of the invention and therefore it may contain information that does not form the prior art that is already known in this country to a person of ordinary skill in the art.

SUMMARY

In one aspect, embodiments of the present invention provide a method of controlling a vehicle for one-pedal driving assistance including acquiring, by a controller, real-time driving information of a subject vehicle detected through a driving information detection unit and real-time vehicle-ahead information detected through a front detection unit, determining, by the controller, whether the subject vehicle has entered an automatic control inspection section using relative distance information with respect to a vehicle ahead in the acquired real-time vehicle-ahead information, starting, by the controller, an automatic distance control mode upon determining that the subject vehicle has entered the automatic control inspection section, and controlling, by the controller, a relative speed with respect to the vehicle ahead by controlling an operation of a driving device for driving the vehicle so that a relative distance with respect to the vehicle ahead is allowed to be adjusted to a target relative distance with respect to the vehicle ahead based on the real-time driving information and the real-time vehicle-ahead information during the automatic distance control mode.

The above and other features and aspects of embodiments of the present invention are discussed herein.

BRIEF DESCRIPTION OF THE DRAWINGS

The above and other features of the embodiments of the present invention will now be described in detail with reference to certain exemplary embodiments thereof illustrated in the accompanying drawings which are given hereinbelow by way of illustration only, and thus are not limitative of the present invention, and wherein.

Figure 1:
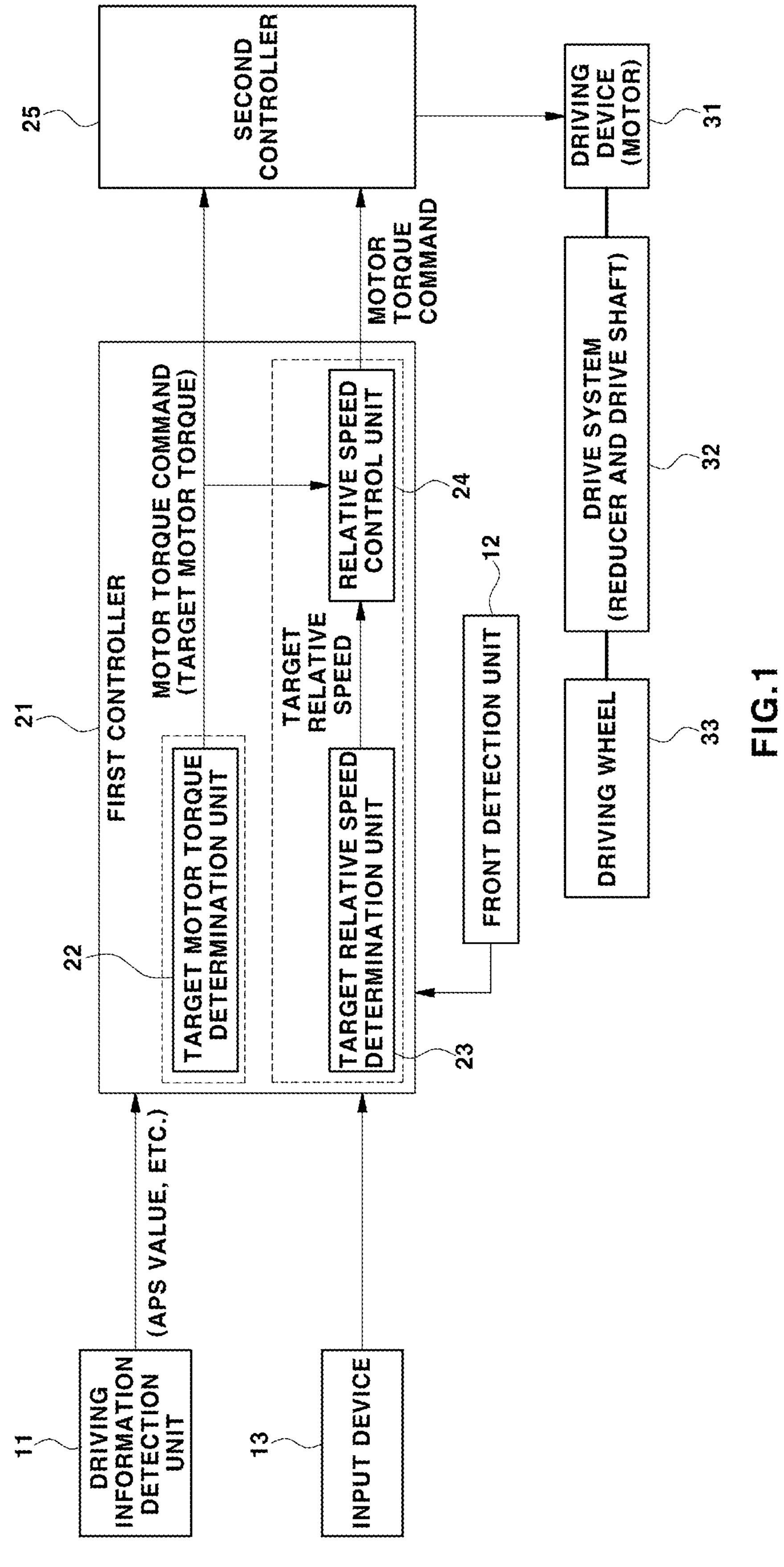
FIG. 1 is a configuration diagram illustrating a system for performing vehicle control according to an embodiment.

In the figures, reference numbers refer to the same or equivalent parts of embodiments of the present invention throughout the several figures of the drawings.

DETAILED DESCRIPTION OF ILLUSTRATIVE EMBODIMENTS

Hereinafter, reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the present disclosure is intended to cover not only the exemplary embodiments, but also various alternatives, modifications, equivalents and other embodiments, which may be included within the spirit and scope of embodiments of the invention as defined by the appended claims.

Meanwhile, in the present disclosure, even though terms such as "first", "second," etc. may be used to describe various elements, the elements are not limited by these terms. These terms are only used to distinguish one element from another. For example, within the scope not departing from the scope of rights according to embodiments of the present invention, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to," should be interpreted similarly.

Like reference numerals refer to like elements throughout. The terminology used herein is for the purpose of describing the embodiments, and is not intended to limit the present invention. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Some embodiments relate to a method of controlling a vehicle for one-pedal driving assistance, and may relate to a method of controlling a vehicle capable of improving convenience of one-pedal driving using a sensor in an electrified vehicle. Some embodiments may reduce the burden on an ankle during one-pedal driving by automatically maintaining a distance to a vehicle ahead at a predetermined distance using a front sensor while an electrified vehicle is driven using one-pedal driving in a congested section.

FIG. 1 is a configuration diagram illustrating a system for performing vehicle control according to an embodiment.

As illustrated in the figure, the system for performing vehicle control according to an embodiment includes a driving information detection unit 11 configured to detect real-time vehicle driving information during vehicle driving, a first controller 21 configured to generate and output a motor torque command based on the vehicle driving information detected by the driving information detection unit 11, and a second controller 25 configured to control an operation of a motor serving as a driving device 31 according to the motor torque command output by the first controller 21.

The driving information detection unit 11 is a component configured to detect vehicle driving information required to generate and determine a motor torque command in the vehicle, and the vehicle driving information may include vehicle state information and driver driving input information.

In an embodiment of the present invention, the driving information detection unit 11 may include an accelerator pedal detection unit configured to detect accelerator pedal input information according to operation of the accelerator pedal of a driver, a wheel speed detection unit configured to detect a wheel speed, and a steering angle detection unit configured to detect a steering angle according to operation of a steering wheel of the driver.

Here, the accelerator pedal detection unit may be a conventional accelerator position sensor (APS) installed on the accelerator pedal to output an electric signal according to an operation state of the accelerator pedal of the driver.

In addition, the wheel speed detection unit may be a conventional wheel speed sensor, and may obtain vehicle speed information along with the wheel speed from a signal of the wheel speed sensor. Obtaining vehicle speed information from a signal of a wheel speed sensor is a well-known technique in the art, and thus a detailed description thereof will be omitted.

In addition, instead of using the signal of the wheel speed detection unit (wheel speed sensor) to acquire the vehicle speed information, the driving information detection unit 11 may further include a separate vehicle speed detection unit for detecting the vehicle speed.

In addition, the steering angle detection unit may be a conventional steering angle sensor (SAS) that outputs an electrical signal according to operation of the steering wheel of the driver.

In this instance, the vehicle driving information may include, as a driving input value according to operation of the accelerator pedal of the driver, an accelerator pedal input value (APS value) detected by the accelerator pedal detection unit, a wheel speed detected by the wheel speed detection unit, a vehicle speed unit (speed of a subject vehicle) obtained by the wheel speed detection unit or detected by the vehicle speed detection unit, and a steering angle detected by the steering angle detection unit. Here, the accelerator pedal input value and the steering angle become the driver driving input information, and the wheel speed and vehicle speed become the vehicle state information.

In addition, the first controller 21 generates and outputs a command for generating target motor torque, that is, a motor torque command, for each of an entry state of an automatic distance control mode and a non-entry state of the automatic distance control mode.

The first controller 21 may be a vehicle control unit (VCU) or a hybrid control unit (HCU) that generates a motor torque command based on vehicle driving information in a conventional electrified vehicle.

Further, the first controller 21 includes a target motor torque determination unit 22 that determines target motor torque during one-pedal driving in a normal state not entering the automatic distance control mode (that is, non-entry state of the automatic distance control mode), and generates a motor torque command for generating the determined target motor torque.

In addition, the first controller 21 further includes a target relative speed determination unit 23 that determines a target relative speed with respect to the vehicle ahead by using vehicle-ahead information in the entry state of the automatic distance control mode, and a relative speed control unit 24 that determines target motor torque for controlling a relative speed (speed relative to the vehicle ahead) in the automatic distance control mode using the determined target relative speed with the vehicle ahead and actual relative speed information, and generates a motor torque command for generating the determined target motor torque.

Here, the target motor torque determination unit 22 determines target motor torque satisfying required torque of the driver based on an accelerator pedal input value (APS value) obtained by the accelerator pedal detection unit APS in the driving information detection unit 11 during one-pedal driving in the non-entry state of the automatic distance control mode, and generates a motor torque command for generating the determined target motor torque.

The target relative speed determination unit 23 determines a target relative speed with the vehicle ahead using relative distance information with the vehicle ahead in vehicle-ahead information detected by a front detection unit 12 during one-pedal driving in an entry state of the automatic distance control mode.

The relative speed control unit 24 determines target motor torque for adjusting the vehicle relative speed (relative speed with the vehicle ahead) in the automatic distance control mode to the target relative speed using an actual relative speed with the vehicle ahead in the vehicle-ahead information detected by the front detection unit 12, and a target relative speed with the vehicle ahead determined and input by the target relative speed determination unit 23, and generates a motor torque command for generating the determined target motor torque.

Accordingly, the motor torque command in the non-entry state of the automatic distance control mode output by the target motor torque determination unit 22 of the first controller 21, and the motor torque command in the entry state of the automatic distance control mode output by the relative speed control unit 24 of the first controller 21 are input to the second controller 25.

The second controller 25 controls the operation of the motor serving as the driving device 31 according to the motor torque command input from the first controller 21. The second controller 25 may be a known motor control unit (MCU) that drives a motor through an inverter in a typical electrified vehicle and controls the operation of the motor.

The second controller 25 controls the operation of the motor serving as the driving device 31 according to the motor torque command in the non-entry state of the automatic distance control mode or the motor torque command in the entry state of the automatic distance control mode input from the first controller 21.

In this specification, the control subject is divided into the first controller 21 and the second controller 25. However, a vehicle control process according to the present embodiment may be performed by one integrated control element instead of a plurality of controllers.

All the plurality of controllers and the one integrated control element may be collectively referred to as a controller, and the control process of the embodiment described below may be performed by the controller. In the following description, the term "controller" refers to both the first controller 21 and the second controller 25 as described above.

As a result, in a state where the operation of the motor serving as the driving device 31 is controlled, torque and rotational force output by the motor are transmitted to a driving wheel 33 through a drive system 32 such as a reducer and a drive shaft as illustrated in FIG. 1, which allows the vehicle to travel and move.

In addition, the system for performing vehicle control according to an embodiment may further include a front detection unit 12 for detecting vehicle-ahead information as a detection element installed in the vehicle separately from the driving information detection unit 11.

In an embodiment of the present invention, the front detection unit 12 may be a radar sensor, a LiDAR sensor, or an ultrasonic wave sensor as a known front sensor for detecting vehicle-ahead information.

The vehicle-ahead information that can be detected by the front detection unit 12 includes a relative distance and a relative speed with respect to the vehicle ahead, and in an embodiment, the relative distance with respect to the vehicle ahead refers to a distance between the subject vehicle and the vehicle ahead.

Further, according to an embodiment, a relative speed $v_{rel}$ with respect to the vehicle ahead refers to a relative speed of the vehicle ahead with respect to the subject vehicle, which is a difference ($v_{rel}=v_{front}-v_{veh}$) between a speed $v_{veh}$ of the subject vehicle and a speed $v_{front}$ of the vehicle ahead.

The relative distance in the vehicle-ahead information is used by the target relative speed determination unit 23, and the relative speed in the vehicle-ahead information is used by the relative speed control unit 24. A method of acquiring information about the vehicle ahead as described above from a signal such as the radar sensor or the LiDAR sensor is a well-known technical matter, and thus a detailed description thereof will be omitted.

The configuration of the system for performing vehicle control according to an embodiment that has been described above with reference to FIG. 1. In an embodiment, relative speed control and relative distance control with respect to the vehicle ahead, and motor control are performed using information detected by the front detection unit 12 during one-pedal driving of the electrified vehicle through the illustrated system.

More specifically, in an embodiment, for automatic distance control between the subject vehicle and the vehicle ahead, the relative speed with respect to the vehicle ahead may be controlled according to the relative distance to the vehicle ahead.

In addition, the driver may set a target relative distance to be maintained with respect to the vehicle ahead using an input device 13 provided in the vehicle to control the distance with respect to the vehicle ahead, and input and set a maximum relative distance that determines an automatic control inspection section to be described later during actual vehicle driving in which automatic distance control is performed using the input device 13.

In addition, in an embodiment, the control mode may be configured differently depending on whether the accelerator pedal is depressed or released within the set maximum relative distance with respect to the vehicle ahead, that is, within the automatic control inspection section.

Here, an on state of the accelerator pedal refers to a state in which the driver depresses the accelerator pedal, and an off state of the accelerator pedal refers to a state in which the driver releases the accelerator pedal and does not depress the accelerator pedal. Information about the on and off states of the accelerator pedal may be obtained from a signal of the accelerator pedal detection unit in the controller (first controller).

In addition, depending on the vehicle speed and the steering angle acquired by the driving information detection unit 11, and the relative distance and relative speed information detected by the front detection unit 12, a timing of performing relative speed control with respect to the vehicle ahead may be differently applied.

In addition, for automatic distance control, the target relative speed to be controlled according to the relative distance may be determined by the controller, that is, the target relative speed determination unit 23 of the first controller 21, and the relative speed control unit 24 of the first controller 21 compares the target relative speed determined by the target relative speed determination unit 23 with the actual relative speed detected through the front detection unit 12 to determine target motor torque for relative speed control.

As described above, in an embodiment, the target motor torque may be determined using the relative speed, and the motor torque command for generating the target motor torque is generated by the first controller 21 and transmitted to the second controller 25.

Accordingly, the second controller 25 including a motor driver or inverter converts the target motor torque corresponding to the motor torque command received from the first controller 21 into a target motor current by using a relationship between the motor torque and the motor current. As a result, the motor torque is controlled while the motor current is adjusted to the target motor current by the motor driver or inverter.

Next, before describing the method of controlling the vehicle for one-pedal driving assistance according to an embodiment, in order to aid in understanding of embodiments of the present invention, problems associated with conventional one-pedal driving and traveling will be described with reference to FIGS. 2 and 3.

Figure 2:
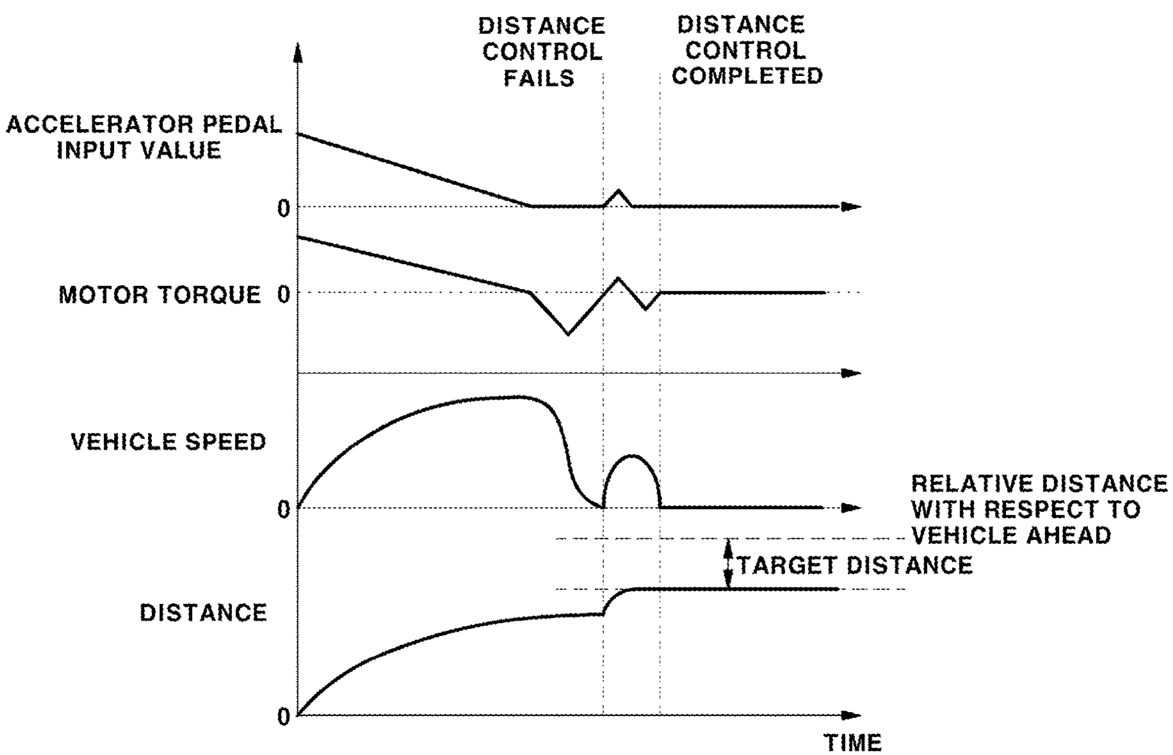
FIGS. 2 and 3 are diagrams for description of a conventional problem.

FIG. 2 illustrates results of driving the vehicle before the driver adapts to one-pedal driving. As illustrated in FIG. 2, when a relative distance to the vehicle ahead is to be maintained at a specific distance (target relative distance) in a congested section of a road with a lot of traffic, the driver predicts that the vehicle will travel a certain distance due to inertia even when the accelerator pedal is released, and releases the accelerator pedal before the target relative distance.

However, in general, when the accelerator pedal is released during one-pedal driving, the regenerative braking mode is entered and negative (−) motor torque is applied to the vehicle. When the motor generates negative torque in this way, the vehicle rapidly decelerates to stop after traveling far less than the distance predicted by the driver.

Therefore, the driver needs to depress the accelerator pedal again to achieve the target distance, and at this time, the relative distance with respect to the vehicle ahead needs to be adjusted again by finely operating the accelerator pedal. For reference, in general, the motor torque is determined by a map set to be proportional to the accelerator pedal input value (APS value).

In this way, during one-pedal driving in a congested section, the driver needs to repeatedly depress/release the accelerator pedal to adjust the distance from the vehicle ahead, resulting in a lot of inconvenience. As a result, utilization of one-pedal driving is degraded.

Figure 3:
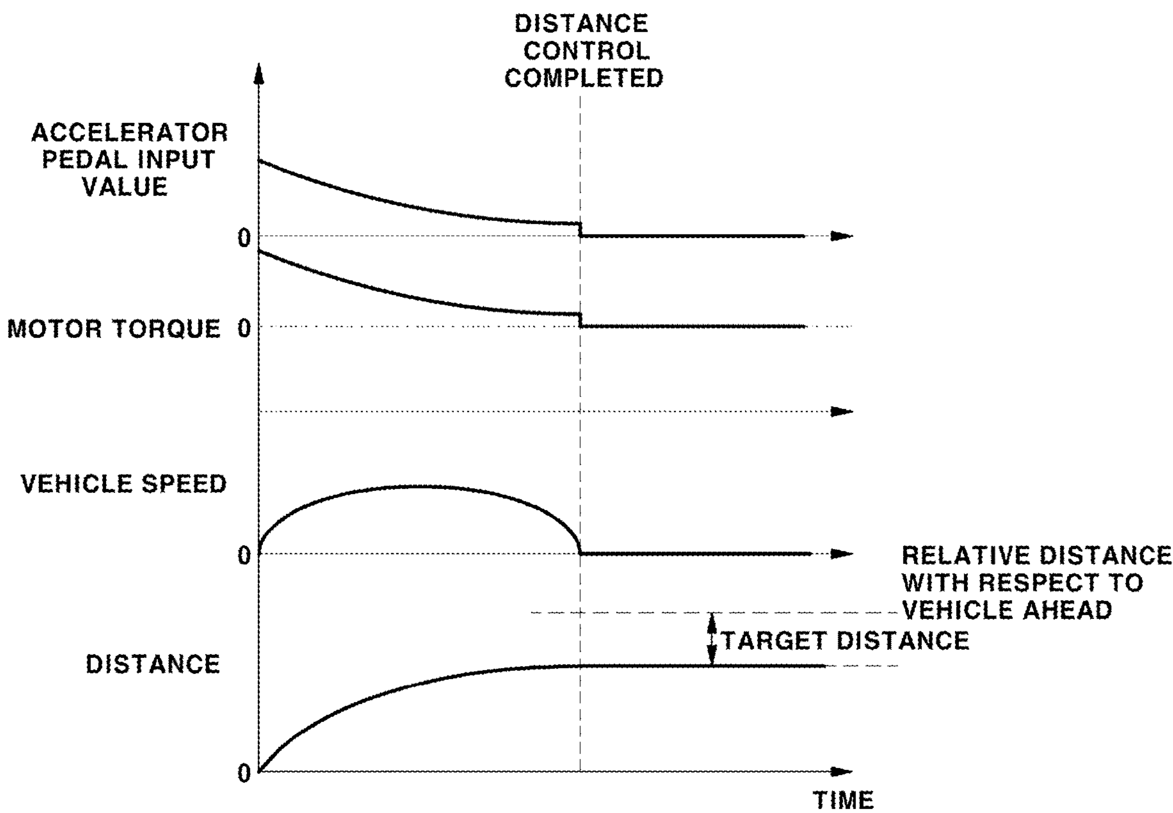

FIG. 3 illustrates a result of driving the vehicle after the driver adapts to one-pedal driving. When a specific distance (target relative distance) with respect to the vehicle ahead is to be maintained in a congested section, there is an inconvenience in that the driver needs to repeatedly depress/release the accelerator pedal. Accordingly, after recognizing the above inconvenience and the driver adapting to one-pedal driving to some extent, the accelerator pedal is finely adjusted when the vehicle approaches the target distance.

For reference, even when the motor generates positive (+) torque, the vehicle speed may gradually decrease due to road surface resistance torque. In this instance, when the vehicle is significantly close to the target distance, the vehicle needs to be driven at an extremely low speed to finely adjust the distance. In this instance, in order to finely adjust the distance, the accelerator pedal needs to be finely adjusted with a significantly small pedal effort, which may put a strain on the ankle of the driver when adjusting the distance, and it is difficult to actually adjust the distance.

In conclusion, in order to adjust the relative distance with respect to the vehicle ahead during the conventional one-pedal driving in the congested section, the ankle of the driver is burdened since the accelerator pedal needs to be repeatedly depressed/released or the accelerator pedal needs to be finely adjusted.

Figure 4:
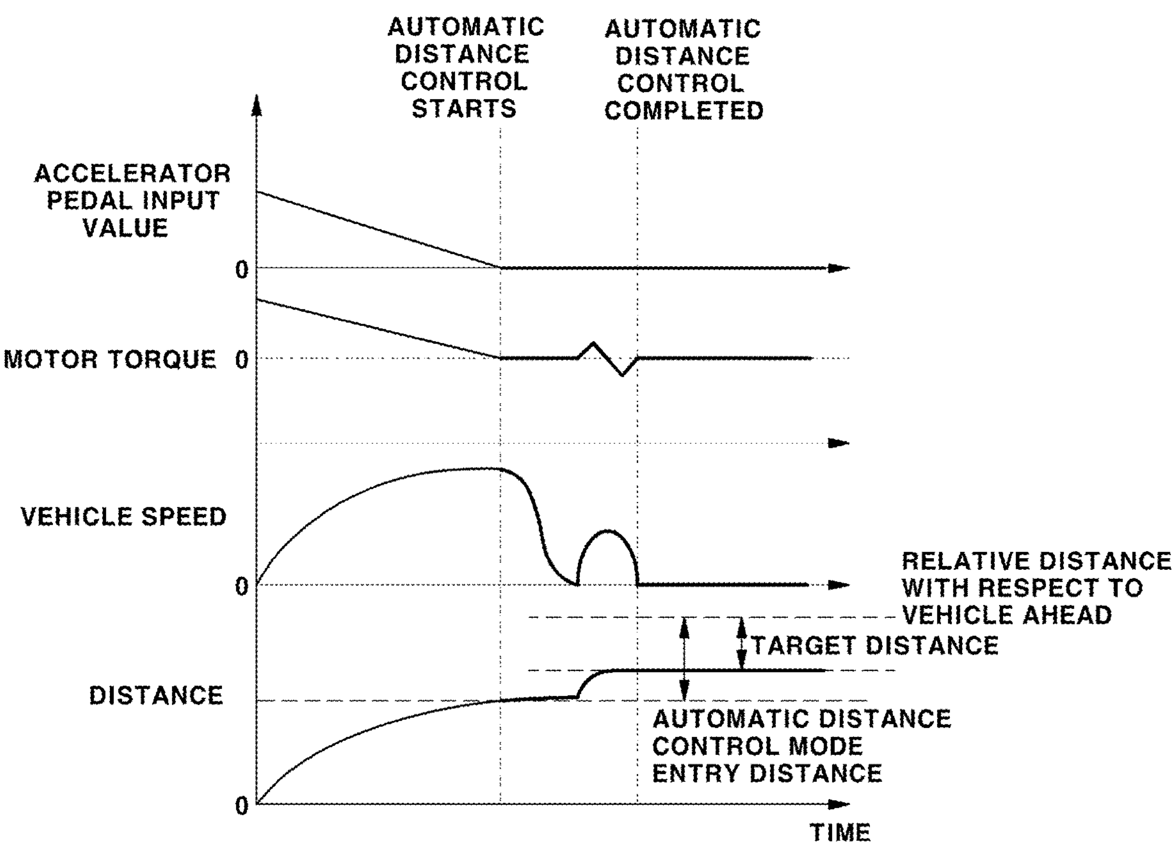
FIGS. 4 and 5 are diagrams illustrating a vehicle control state according to an embodiment, and are diagrams illustrating an accelerator pedal off mode.
Figure 5:
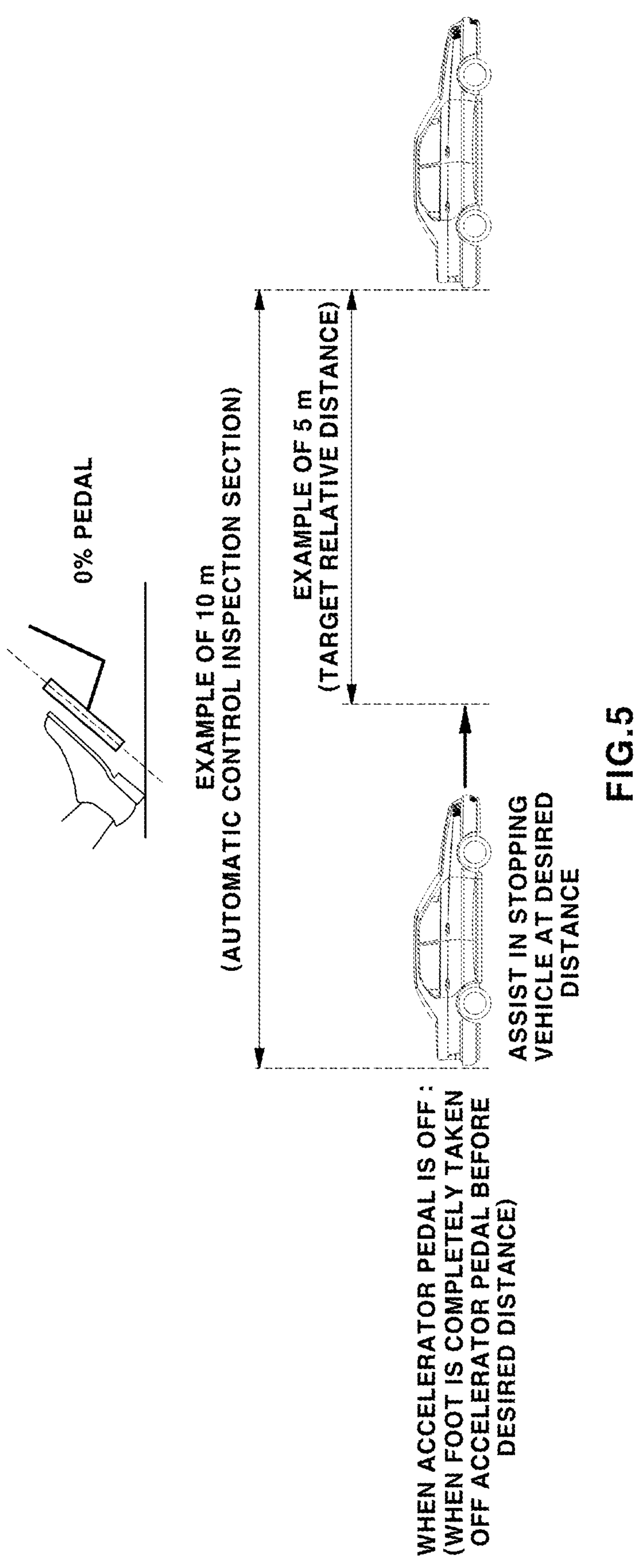

Hereinafter, embodiments will be described in further detail. FIGS. 4 and 5 are diagrams illustrating a vehicle control state according to an embodiment, and illustrates the accelerator pedal off mode. Unless otherwise specified in the following description, the relative distance refers to a distance to the vehicle ahead, specifically, a relative distance between the subject vehicle and the vehicle ahead.

In accordance with an embodiment, the controller (first controller) determines whether the vehicle has entered the automatic inspection control section using relative distance information in the vehicle-ahead information detected by the front detection unit 12. In this case, when the vehicle reaches the maximum relative distance set by the driver, the controller may determine that the vehicle has entered the automatic inspection control section.

In addition, when the vehicle enters the automatic inspection control section, the automatic distance control mode is started by the controller (first controller), and the automatic distance control mode includes an accelerator pedal off mode and an accelerator pedal on mode.

Upon determining that the accelerator pedal is in the off state from the accelerator pedal input value (APS value) when the vehicle enters the automatic inspection control section, the controller (first controller) enters the accelerator pedal off mode of the automatic distance control mode.

On the other hand, upon determining that the accelerator pedal is in the on state from the accelerator pedal input value (APS value) when the vehicle enters the automatic inspection control section, the controller (first controller) enters the accelerator pedal on mode of the automatic distance control mode.

The accelerator pedal off mode is a mode in which the vehicle speed is controlled to stop the vehicle at a desired distance (target relative distance with respect to the vehicle ahead) even when the driver completely releases the accelerator pedal within an automatic distance control mode entry distance before the vehicle reaches a specific distance (target relative distance) to be maintained with respect to the vehicle ahead.

In this process, when the accelerator pedal is released, a control operation may be performed after the vehicle is completely stopped so that the relative distance (actual distance) with respect to the vehicle ahead becomes the target relative distance. Alternatively, while the vehicle speed is gradually reduced without stopping, it is possible to adjust the relative distance with respect to the vehicle ahead to be the target relative distance (see FIG. 4).

In the accelerator pedal off mode, even when the driver completely releases the accelerator pedal at a position before reaching the specific distance desired to be maintained with respect to the vehicle ahead, that is, even when the driver is not depressing the accelerator pedal, the vehicle is stopped at the target relative distance with respect to the vehicle ahead (refer to FIG. 5) by automatically controlling the vehicle speed (relative speed control) and generating motor torque.

Figure 6:
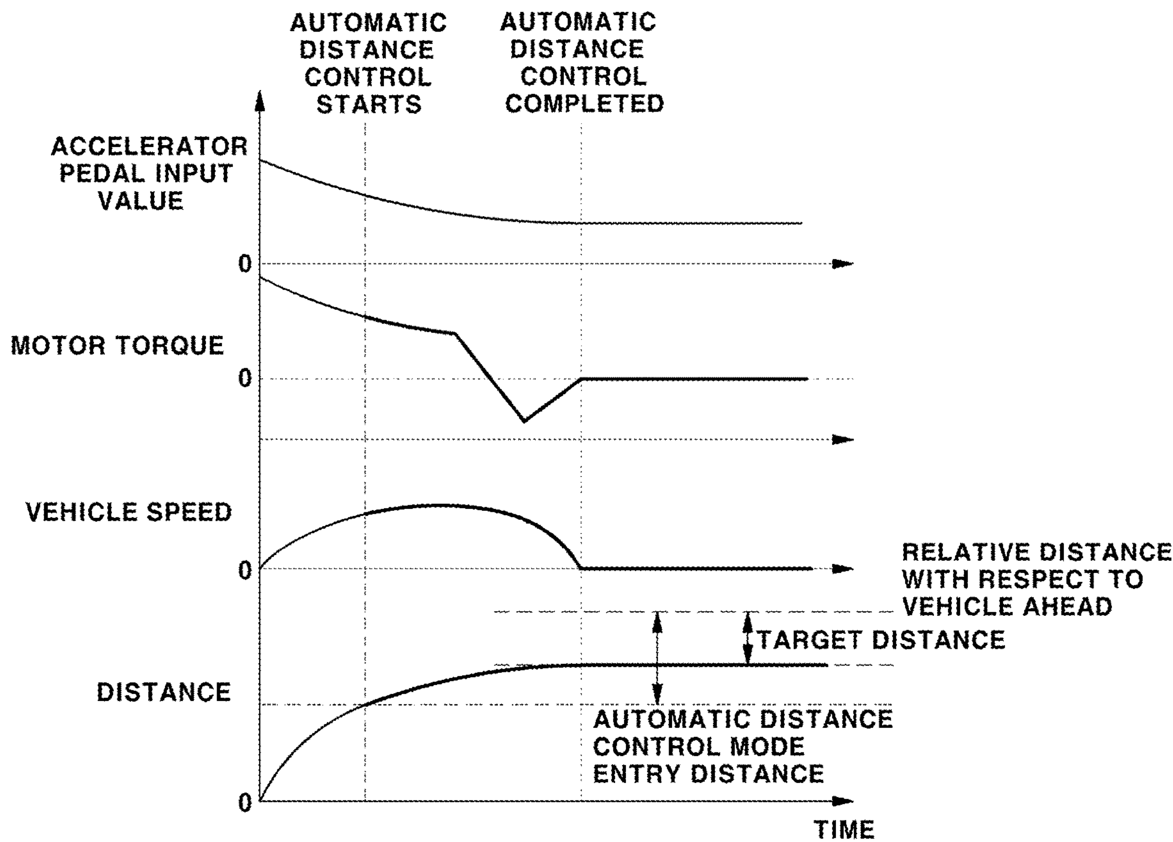
FIGS. 6 and 7 are diagrams illustrating a vehicle control state according to an embodiment, and are diagrams illustrating an accelerator pedal on mode.
Figure 7:
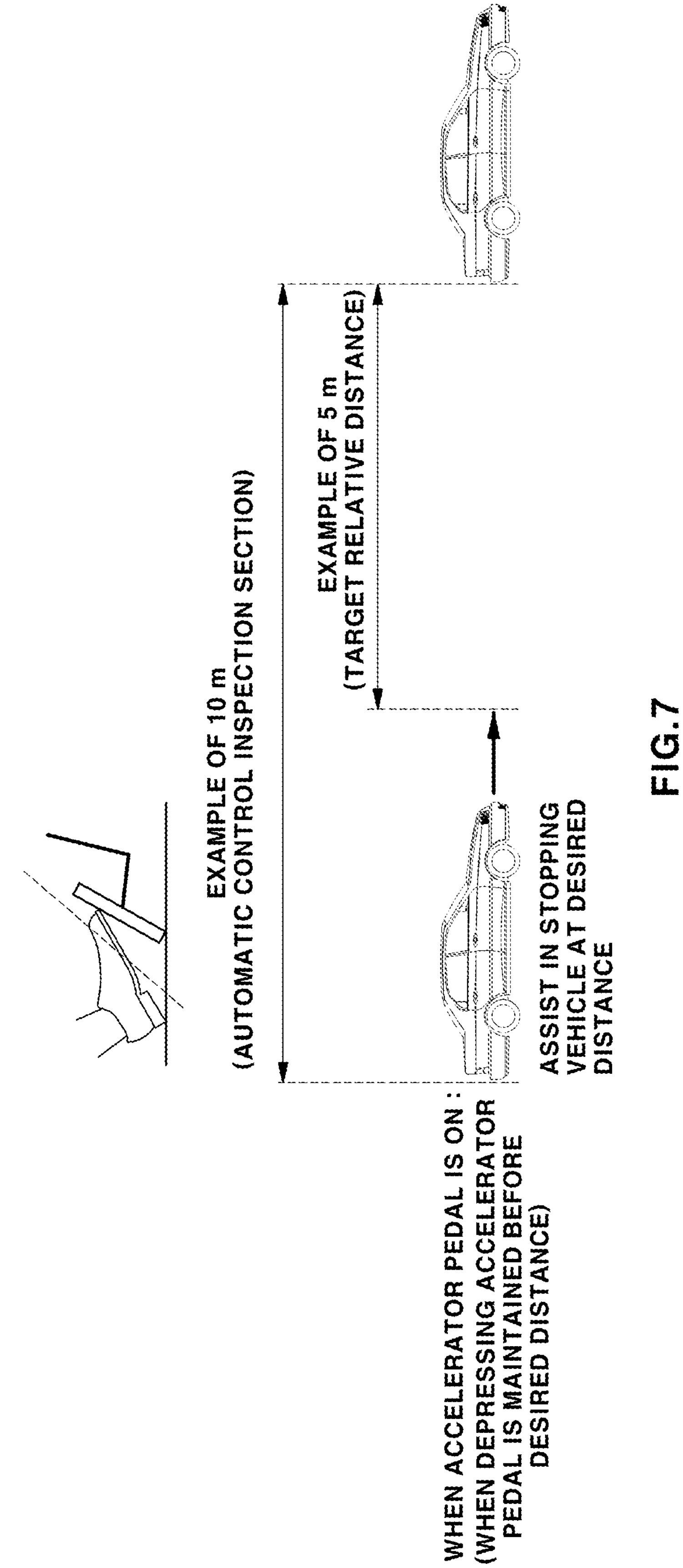

FIGS. 6 and 7 are diagrams illustrating a vehicle control state according to an embodiment and illustrate the accelerator pedal on mode.

The accelerator pedal on mode is a mode in which the vehicle speed is controlled to stop the vehicle at a desired distance (target relative distance with respect to the vehicle ahead) by controlling the vehicle speed when the driver depresses the accelerator pedal in the on state within the automatic distance control mode entry distance before the vehicle reaches a specific distance (target relative distance) to be maintained with respect to the vehicle ahead.

In this process, when the driver depresses the accelerator pedal before reaching a specific distance to be maintained with respect to the vehicle ahead, and when the vehicle accelerates without change, the vehicle may pass a position corresponding to the target relative distance, and thus the vehicle speed is controlled and motor torque is generated so that the vehicle can be stopped at the target relative distance with respect to the vehicle ahead.

Meanwhile, as described above, it is possible to input and set a target relative distance to be maintained with respect to the vehicle ahead using the input device 13 of the vehicle connected to the controller (first controller).

In addition, the driver may input and set a maximum relative distance in the automatic control inspection period defining an automatic control inspection period in which automatic distance control is performed using the input device 13.

The maximum relative distance may be defined as a distance (maximum relative distance) between the vehicle ahead and a position farthest from the vehicle ahead in a section in which the automatic distance control mode is performed (which is the automatic control inspection section). Here, the farthest position is a start position of the automatic control inspection section and a position where the automatic distance control mode starts.

In addition, a distance between the start position of the automatic control inspection section (the position where the automatic distance control mode starts) and the vehicle ahead becomes a control start relative distance (maximum relative distance in the automatic control inspection section).

In this way, a section from a position of the vehicle ahead to a position corresponding to the maximum relative distance becomes the automatic control inspection section, and in a state in which the driver inputs and sets the maximum relative distance in advance through the input device 13, the controller determines a section within the maximum relative distance from the vehicle ahead as the automatic control inspection section.

As a result, when the vehicle reaches a position away from the vehicle ahead by the set maximum relative distance (automatic control inspection section start position), the vehicle controller enters the automatic distance control mode, and the controller sets a section from this position to the position of the vehicle ahead as the automatic control inspection section.

In an embodiment, when the vehicle reaches a position separated by the set maximum relative distance from the vehicle ahead, that is, when the vehicle enters the automatic control inspection section, if the accelerator pedal is in the on state in which the accelerator pedal input value is greater than 0, the accelerator pedal on mode of the automatic distance control mode starts in the controller.

In addition, when the vehicle enters the automatic control inspection section, if the accelerator pedal is in the off state in which the accelerator pedal input value is 0, the accelerator pedal off mode of the automatic distance control mode starts in the controller.

Hereinafter, the accelerator pedal on mode and the accelerator pedal off mode will be described in detail.

In the following description, the relative distance or vehicle relative distance refers to a distance (relative distance) from the vehicle ahead, which means a distance between the subject vehicle and the vehicle ahead. In addition, in the following description, the relative speed or vehicle relative speed refers to a relative speed with respect to the vehicle ahead, which means a speed difference between the subject vehicle and the vehicle ahead, that is, a difference between the speed of the subject vehicle and the speed of the vehicle ahead.

In various embodiments, the relative speed control controls the relative speed with respect to the vehicle ahead, which is performed by controlling the vehicle speed of the subject vehicle, that is, controlling the speed of the subject vehicle, and speed control of the subject vehicle may be performed by controlling the motor torque of the subject vehicle.

In various embodiments, the term "relative speed control" is mentioned as control of the vehicle relative distance since the target relative speed is calculated as a function of the relative distance by upper control, and then the relative speed is controlled by lower control. That is, the relative speed is controlled to control the relative distance.

1. Accelerator Pedal on Mode

The controller (first controller) may be set to perform vehicle relative speed control only when the vehicle relative distance (distance to the vehicle ahead) is less than or equal to a predetermined control start relative distance in the accelerator pedal on mode.

This description may be summarized and expressed as follows.

When $s>s_{on.start}$, relative speed control is not performed.

When $s\leq s_{on.start}$, relative speed control is performed.

Here, s denotes the vehicle relative distance, and $s_{on.start}$ denotes the control start relative distance.

The control start relative distance ($s_{on.start}$) may be determined as the distance of the automatic control inspection section, that is, the maximum relative distance (Δcon) preset by the driver ($s_{on.start}$=Δcon). Alternatively, as will be described later, the control start relative distance ($s_{on.start}$) may be obtained from information such as the vehicle speed of the subject vehicle (control target vehicle), a maximum deceleration torque limit of the motor, and road surface resistance torque during the accelerator pedal on mode.

The control start relative distance is varied depending on the vehicle speed, the maximum deceleration torque limit of the motor, the road surface resistance torque, etc. since there is a distance traveled kinematically (hereinafter "minimum travel distance") when the vehicle is decelerated to the maximum motor torque for a specific vehicle speed and road surface resistance torque, and the vehicle needs to be decelerated at a distance farther than the minimum travel distance for the specific vehicle speed in order to stop the vehicle at the target relative distance.

The controller (first controller) may be set to perform vehicle relative speed control only when the vehicle speed, that is, the speed of the subject vehicle is less than or equal to a determined control start relative speed in the accelerator pedal on mode.

This description may be summarized and expressed as follows.

When $v_{veh}>v_{veh.threshold}$, relative speed control is not performed.

When $v_{veh}\leq v_{veh.threshold}$, relative speed control is performed.

Here, $v_{veh}$ denotes the vehicle speed, and $v_{veh.threshold}$ denotes the control start relative speed.

In addition, the controller (first controller) may be set to perform vehicle relative speed control only when a condition determined as below is satisfied based on vehicle driving information such as the wheel speed and the vehicle speed (speed of the subject vehicle) and relative speed information in the accelerator pedal on mode.

When $|r_w\omega_w+v_{rel}|>v_{diff.threshold}$, relative speed control is not performed.

When $|r_w\omega_w+v_{rel}|\leq v_{diff.threshold}$, relative speed control is performed.

$$v_{rel}=v_{front}-v_{veh},\ v_{veh}=r_w\omega_w.$$

Here, $v_{front}$, $v_{veh}$, $r_w$, $\omega_w$, $v_{rel}$, and $v_{diff.threshold}$ denote the speed of the vehicle ahead, the speed of the subject vehicle (control target vehicle), a wheel radius of the subject vehicle, the wheel speed of the subject vehicle, the relative speed, and a preset limit, respectively.

As described above, the determined condition may be set as a condition that the sum of the speed $v_{veh}$ of the subject vehicle and the relative speed $v_{rel}$ is equal to or less than the limit $v_{diff.threshold}$.

In addition, the controller (the first controller) may be set to perform vehicle relative speed control only when the steering angle is equal to or less than a determined steering angle limit in the accelerator pedal on mode.

This description may be summarized and expressed as follows.

When $\theta_{steer}>\theta_{steer.threshold}$, relative speed control is not performed.

When $\theta_{steer}\leq\theta_{steer.threshold}$, relative speed control is performed.

Here, $\theta_{steer}$ denotes a steering angle, and $\theta_{steer.threshold}$ denotes a steering angle limit.

As described above, several conditions for performing relative speed control in the accelerator pedal on mode are presented, and when the controller (first controller) determines that some or all of the conditions for performing relative speed control are simultaneously satisfied, the relative speed control may be performed.

Further, according to an embodiment, the control start relative distance ($s_{on.start}$) may be calculated using the minimum travel distance ($d_{rel.decel.min}$) and the target relative distance ($s_{target}$) of the vehicle.

Among these distances, the minimum travel distance of the vehicle may be calculated as follows.

First, a driveline kinematics model from the motor to the wheel (driving wheel) may be expressed as the following equations:

$$\dot{\omega}_w=\frac{i_f\eta_f}{(J_v+i_f^2J_m)}T_m-\frac{1}{(J_v+i_f^2J_m)}T_{dist}=a_1T_m+a_2T_{dist}. \quad \text{Equation 1}$$

$$\dot{v}_{rel}=-\frac{r_wi_f\eta_f}{(J_v+i_f^2J_m)}T_m+\frac{r_w}{(J_v+i_f^2J_m)}T_{dist}=a_3T_m+a_4T_{dist}. \quad \text{Equation 2}$$

Here, $i_f$, $\eta_f$, $J_v$, $J_m$, $T_m$, and $T_{dist}$ denote a gear ratio from the motor to the wheel, gear efficiency from the motor to the wheel, vehicle rotational inertia, motor rotational inertia, motor torque, and disturbance torque, respectively, and $a_1$, $a_2$, $a_3$, and $a_4$ denote proportional constants set in consideration of parameters such as the gear ratio and the gear efficiency.

In addition, when the maximum deceleration torque of the motor, which is negative (−) torque, is denoted by $-T_{m.max}$, and the relative speed and the road surface resistance torque when the accelerator pedal on mode is entered are denoted by $v_{rel.on.in}$ and $T_{dist.on.in}$, respectively, the minimum travel distance ($d_{rel.decel.min}$) may be calculated as in Equation 3 below. The relative speed when entering the accelerator pedal on mode and the relative speed when entering the accelerator pedal off mode, which will be described later, may be obtained from a radar sensor system.

$$\dot{v}_{rel}=-a_3T_{m.max}+a_4T_{dist.on.in}. \quad \text{Equation 3}$$

$$v_{rel.future}=v_{rel.on.in}+[-a_3T_{m.min}+a_4T_{dist.on.in}]t=0. \quad \text{Equation 4}$$

$$t_f=-\frac{v_{rel.on.in}}{-a_3T_{m.max}+a_4T_{dist.on.in}}. \quad \text{Equation 5}$$

$$d_{rel.decel.min}=\frac{1}{2}\frac{v_{rel.on.in}^2}{-a_3T_{m.max}+a_4T_{dist.on.in}}=a_5v_{rel.on.in}^2. \quad \text{Equation 6}$$

Here, $v_{rel.future}$, $t_f$, and $d_{rel.decel.min}$ denote a future relative speed, a time when the vehicle ends deceleration, and the minimum travel distance of the subject vehicle, respectively, and $a_5$ denotes a proportional constant calculated and set assuming that $T_{m.min}$ and $T_{dist.on.in}$ are fixed values. As the road surface resistance torque $T_{dist.on.in}$ in the above equations, an estimated value of the road surface resistance torque to be described later may be used.

As a result, in the accelerator pedal on mode, the control start relative distance ($s_{on.start}$) may be determined as in Equation 7 below using the minimum travel distance ($d_{rel.decel.min}$) and the target relative distance ($s_{target}$) of the vehicle.

Further, referring to Equation 6, it can be seen that the minimum travel distance is obtained and used only by the relative speed ($v_{rel.on.in}$, which may be obtained by the radar sensor system) when the controller enters the accelerator pedal on mode.

$$s_{on.start} = k_1(d_{rel.decel.min} + s_{target}) \quad \text{Equation 7}$$

Here, $k_1$ is a proportional constant set in consideration of uncertainty of the minimum travel distance.

Hereinafter, a method of determining the target relative speed in the accelerator pedal on mode will be described.

The target relative speed is determined by the target relative speed determination unit 23 of the first controller 21. When relative speed control is performed in the accelerator pedal on mode, the target relative speed may be determined using a formula or a map determined from the relative distance.

The formula or map defines a correlation between the relative distance and the target relative speed, which is input in advance to the target relative speed determination unit 23 of the first controller 21 and becomes setting information used to determine the target relative speed.

Equation and map data representing the correlation between the relative distance and the target relative speed may vary depending on the ride comfort of the vehicle. An example of determining the target relative speed will be described as follows.

Assuming that the vehicle accelerates from an initial speed 0 at constant acceleration, the vehicle speed ($v_{veh}$=v) and the vehicle displacement (d) may be expressed as the following equations:

$$v = at. \quad \text{Equation 8}$$

$$d = \frac{1}{2}at^2. \quad \text{Equation 9}$$

$$t = \sqrt{2ad}. \quad \text{Equation 10}$$

$$v = a\sqrt{2ad}. \quad \text{Equation 11}$$

In Equations 8 to 11, v (=$v_{veh}$), a, d, and t denote the speed of the vehicle (vehicle speed), vehicle acceleration, vehicle displacement (moved distance), and time, respectively.

An example of an equation capable of determining the target relative speed based on the above equation is as follows:

$$v_{rel.target} = \begin{cases} a_{rel.target}\sqrt{2a_{rel.target}(s - s_{target})} & (s < s_{target}) \\ 0 & (s \geq s_{target}) \end{cases}. \quad \text{Equation 12}$$

Here, $v_{rel.target}$, $a_{rel.target}$, s, and $s_{target}$ denote a target relative speed, target relative acceleration, relative distance, and target relative distance with respect to the vehicle ahead, where the target relative acceleration corresponds to a preset tuning variable.

Figure 8:
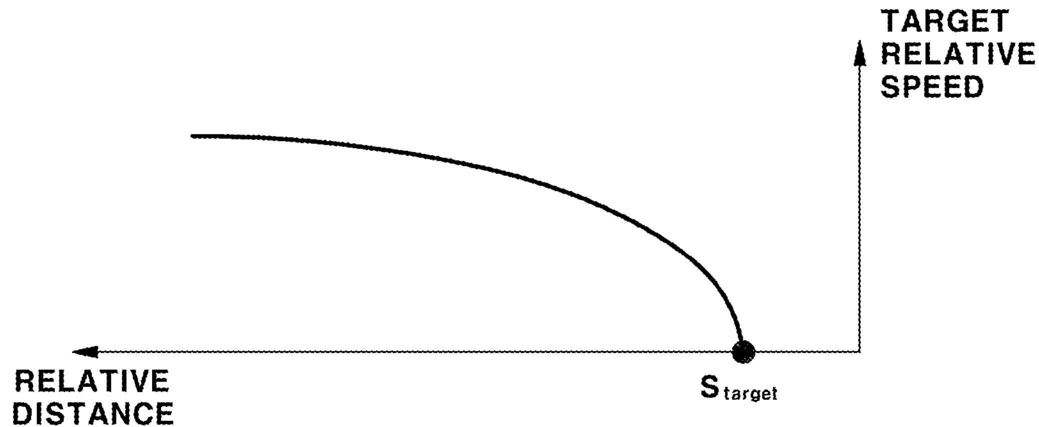
FIGS. 8 and 9 are graphs illustrating a target relative speed with respect to a relative distance in the accelerator pedal on mode according to an embodiment.

A function of Equation 12 is illustrated as a graph in FIG. 8. FIG. 8 is a graph illustrating the target relative speed with respect to the relative distance in the accelerator pedal on mode.

As another example of determining the target relative speed, when the vehicle relative speed at the start of the relative speed control is set to $v_{rel.in}$, the relative speed vrel.in at the start of the relative speed control may be limited by applying a lower limit when the relative speed $v_{rel.in}$ is significantly small. A reason therefor is that, when the relative speed vrel.in at the start of the relative speed control is close to 0, the vehicle may not be able to proceed forward.

Taking this fact into consideration, the target relative speed may be determined as shown in the following equation:

$$v_{rel.target} = \begin{cases} \frac{v_{rel.in}}{s_{on.start} - s_{target}}(s - s_{target}) & (s < s_{target}) \\ 0 & (s \geq s_{target}) \end{cases}. \quad \text{Equation 13}$$

Figure 9:
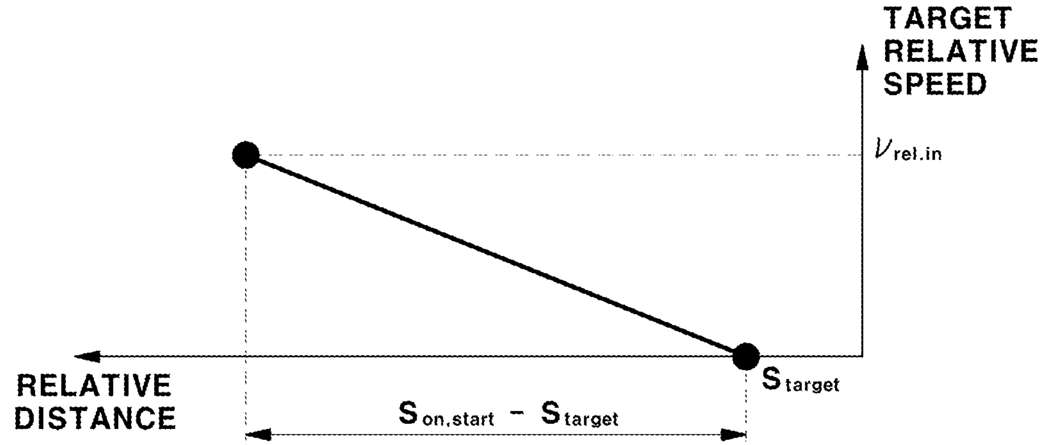

A function of Equation 13 is illustrated as a graph in FIG. 9.

Next, the relative speed control performed in the accelerator pedal on mode will be described.

In a process of controlling the relative speed, the target motor torque may be determined by first comparing the determined target relative speed with the actual relative speed detected by the front detection unit 12. The motor target torque may be determined by the relative speed control unit 24 of the first controller 21.

In this instance, the target motor torque may include feedforward control input and feedback control input.

$$T_{mot.target} = F_{feedforward} + F_{feedback} \quad \text{Equation 14}$$

Here, $T_{mot.target}$, $F_{feedforward}$, and $F_{feedback}$ denote target motor torque, feedforward control input, and feedback control input, respectively. As shown in Equation 14, the target motor torque may be obtained as the sum of the feedforward control input and the feedback control input.

Additionally, when the target motor torque is determined, a maximum value or a minimum value of the target motor torque may be limited, or a change amount of the target motor torque may be limited. Here, target motor torque calculated on the assumption that one-pedal driving is normally performed may be used as a maximum limit (upper limit) for limiting the maximum value of the target motor torque and a minimum limit (lower limit) for limiting the minimum value of the target motor torque.

The target motor torque during normal one-pedal driving may be determined from an accelerator pedal input value detected by an accelerator pedal unit of the driving information detection unit 11. In this instance, it is possible to use a formula or map capable of determining the target motor torque by taking the accelerator pedal input value as input.

In Equation 14, feedback control input may be determined by the following Equation 15 from an error between the target relative speed and the actual relative speed.

$$F_{feedback} = k_p e + k_i \int e dt + k_d \frac{de}{dt}. \quad \text{Equation 15}$$

Here, e denotes a difference between the two speeds, that is, the error between the target relative speed and the actual relative speed, $k_p$, $k_i$, and $k_d$ denote gains serving as tuning variables, and each gain value may be a value that varies according to a relative distance or time.

In Equation 14, the feedforward control input may be calculated using the vehicle model and vehicle relative speed or wheel speed information of the vehicle. Referring to the aforementioned vehicle driveline kinematics model, an estimator system for estimating road surface resistance torque may be summarized as follows:

$$\dot{v}_{rel} = a_3 T_m + a_4 T_{dist} \quad \text{Equation 16}$$

$$\dot{x} = Ax + Bu$$

$$y = Cx$$

$$x = \begin{bmatrix} v_{rel} \\ T_{dist} \end{bmatrix}, y = v_{rel}, u = T_m,$$

$$A = \begin{bmatrix} 0 & a_3 \\ 0 & 0 \end{bmatrix}, B = a_4, C = [1 \ \ 0]$$

The feedforward control input may be determined as shown in Equation 17 below using Equation 16 and the relative speed information.

$$\dot{\hat{x}} = A\hat{x} + Bu + L_1(y - \hat{y}) \quad \text{Equation 17}$$

$$\hat{y} = C\hat{x}$$

$$F_{feedforward} = \frac{1}{a_3}\left(\dot{v}_{rel.target} - a_4\hat{T}_{dist}\right) = a_6\dot{v}_{rel.target} + a_7\hat{T}_{dist}$$

Here, ^ denotes an estimated value, $L_1$ denotes a tuning variable, and $a_6$ and $a_7$ denote proportional constants.

Further, the estimator system for estimating the road surface resistance torque may be additionally summarized as follows:

$$\dot{\omega}_w = a_1 T_m + a_2 T_{dist} \quad \text{Equation 18}$$

$$\dot{x} = Ax + Bu$$

$$y = Cx$$

$$x = \begin{bmatrix} \omega_w \\ T_{dist} \end{bmatrix}, y = \omega_w, u = T_m,$$

$$A = \begin{bmatrix} 0 & a_1 \\ 0 & 0 \end{bmatrix}, B = a_2, C = [1 \ \ 0].$$

The feedforward control input may be determined as shown in Equation 19 below using Equation 18 and the wheel speed information.

$$\dot{\hat{x}} = A\hat{x} + Bu + L_2(y - \hat{y}) \quad \text{Equation 19}$$

$$\hat{y} = C\hat{x}$$

$$F_{feedforward} = \frac{1}{a_1}\left(\dot{v}_{rel.target} - a_2\hat{T}_{dist}\right) = a_8\dot{v}_{rel.target} + a_9\hat{T}_{dist}$$

Here, $L_2$ denotes a tuning variable, and $a_8$ and $a_9$ denote proportional constants.

As a result, referring to Equations 17 and 19, it can be seen that the feedforward control input may be calculated using the target relative speed and the estimated value of the road surface resistance torque.

When the target motor torque is determined as described above, the relative speed control unit 24 of the first controller 21 generates a target motor torque command, that is, a command for generating the target motor torque, as a final motor torque command, and outputs the generated command to the second controller 25, and the second controller 25 controls an operation of the motor, which is the driving device 31 of the vehicle, according to the motor torque command output from the relative speed control unit 24 of the first controller 21. Accordingly, torque corresponding to the target motor torque may be generated and output from the motor.

2. Accelerator Pedal Off Mode

The controller (first controller) may be set to perform vehicle relative speed control according to the vehicle relative distance (distance to the vehicle ahead) s and the target relative distance $s_{target}$ in the accelerator pedal off mode.

The relative speed control may be performed after the vehicle is temporarily stopped in the accelerator pedal off mode, and the relative speed control may be performed immediately after entering the accelerator pedal off mode. When the relative speed control is performed after the vehicle is temporarily stopped, the following control condition may be considered.

That is, when $d_{rel.coast.max} > s - s_{target}$, the relative speed control is performed immediately after entering the accelerator pedal off mode, and when $d_{rel.coast.max} \leq s - s_{target}$, the relative speed control is performed after waiting for a vehicle speed $v_{veh}$ to become less than or equal to a set vehicle speed limit $A_1$ ($v_{veh} \leq \Delta_1$) in a state of not applying motor torque to the vehicle.

Here, $d_{rel.coast.max}$ represents a maximum travel distance of the subject vehicle, and this maximum travel distance refers to a maximum travel distance by which the vehicle travels while decelerating naturally by the road surface resistance torque when no motor torque is applied to the vehicle.

A reason for considering the above condition is to consider the maximum travel distance, which is a kinematic distance by which the vehicle naturally travels while decelerating when no motor torque is applied to the vehicle. When a remaining relative distance ($s - s_{target}$) to the target relative distance $S_{target}$ is smaller than the maximum travel distance, and when the relative distance control is started after waiting for the vehicle to stop, the vehicle may exceed the target relative distance.

In addition, the controller (first controller) may be set to perform vehicle relative speed control only when the vehicle speed, that is, the speed of the subject vehicle (control target vehicle), is equal to or less than a predetermined control start relative speed in the accelerator pedal off mode.

This description may be summarized and expressed as follows.

When $v_{veh} > v_{veh.threshold}$, relative speed control is not performed.

When $v_{veh} \leq v_{veh.threshold}$, relative speed control is performed.

In addition, the controller (first controller) may be set to perform vehicle relative speed control only when a condition determined below is satisfied based on vehicle driving information such as the wheel speed and the vehicle speed (the speed of the subject vehicle) and the relative speed information in the accelerator pedal off mode.

When $|r_w\omega_w + v_{rel}| > v_{diff.threshold}$, relative speed control is not performed.

When $|r_w\omega_w + v_{rel}| \leq v_{diff.threshold}$, relative speed control is performed.

In addition, the controller (first controller) may be set to perform vehicle relative speed control only when the steering angle is equal to or less than a predetermined steering angle limit in the accelerator pedal off mode.

This description may be summarized and expressed as follows.

When $\theta_{steer} > \theta_{steer.threshold}$, relative speed control is not performed.

When $\theta_{steer} > \theta_{steer.threshold}$, relative speed control is performed.

As described above, several conditions for performing relative speed control in the accelerator pedal off mode are presented, and when the controller (first controller) determines that some or all of the conditions for performing relative speed control are simultaneously satisfied, the relative speed control may be performed.

Next, a method of determining the maximum travel distance will be described as follows.

The maximum travel distance may be determined as the following equations on the assumption that the motor torque is not applied to the vehicle using a relative speed $v_{rel.off.in}$ and road surface resistance torque $T_{dist.off.in}$ when entering the accelerator pedal off mode.

$$\dot{v}_{rel} = a_4 T_{dist.off.in}. \quad \text{Equation 20}$$

$$v_{rel} = v_{rel.off.in} + a_4 T_{dist.off.in} t. \quad \text{Equation 21}$$

$$t_f = -\frac{v_{rel.off.in}}{a_4 T_{dist.off.in}}. \quad \text{Equation 22}$$

$$d_{rel.coast.max} = \frac{1}{2}\frac{v_{rel.off.in}^2}{a_4 T_{dist.off.in}} = a_{10} v_{rel.off.in}^2. \quad \text{Equation 23}$$

Here, $t_f$ denotes a time at which the vehicle stops decelerating, and $a_{10}$ denotes a proportional constant set by calculation on the assumption that the road surface resistance torque $T_{dist.off.in}$ is a fixed value. In the above equation, the estimated value of the road surface resistance torque may be used as the road surface resistance torque $T_{dist.off.in}$.

Further, referring to Equation 23, it can be seen that the maximum travel distance may be obtained and used only with the relative speed vrel.off.in when the controller enters the accelerator pedal off mode.

The target relative speed in the accelerator pedal off mode may be determined in the same manner as the above-described determination method in the accelerator pedal on mode.

Figure 10:
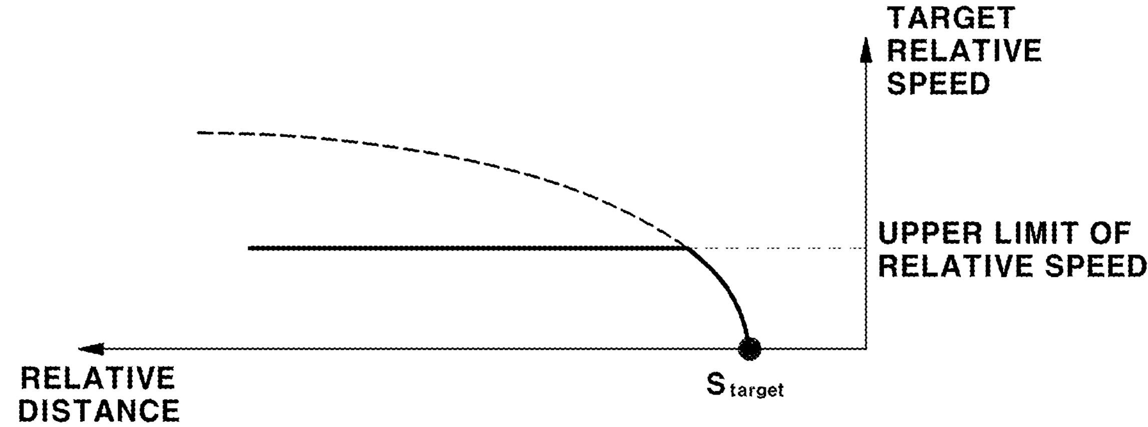
FIGS. 10 and 11 are diagrams illustrating examples of a target relative speed when relative speed control is performed after a vehicle stops in the accelerator pedal off mode according to an embodiment.
Figure 11:
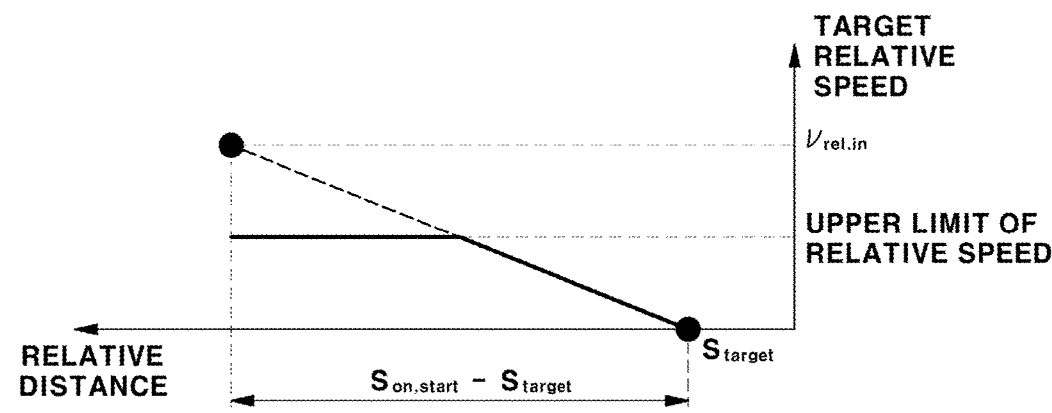

When relative speed control is performed after the vehicle is stopped, determination may be performed by limiting a maximum value of the target relative speed, and FIGS. 10 and 11 are examples of the target relative speed when relative speed control is performed after the vehicle is stopped in the accelerator pedal off mode. As illustrated in the figure, the target relative speed may be obtained as a value limited by a set upper limit of the relative speed.

When relative speed control is performed immediately after entering the accelerator pedal off mode, the example immediately after entering the accelerator pedal on mode illustrated in FIGS. 8 and 9 may be referred to without change as an example of the target relative speed. However, in the case of the accelerator pedal off mode, only the relative speed "$v_{rel.in}$" at the start of the relative speed control in FIG. 9 is replaced with the relative speed "$v_{rel.off.in}$" when entering the accelerator pedal off mode.

In addition, the relative speed control method in the accelerator pedal off mode is the same as the above-described relative speed control method in the accelerator pedal on mode. In order to avoid overlap, a separate description of the relative speed control method in the accelerator pedal off mode is omitted. As described above, even in the accelerator pedal off mode, the relative speed control may be performed in the same manner as in the accelerator pedal on mode.

Figure 12:
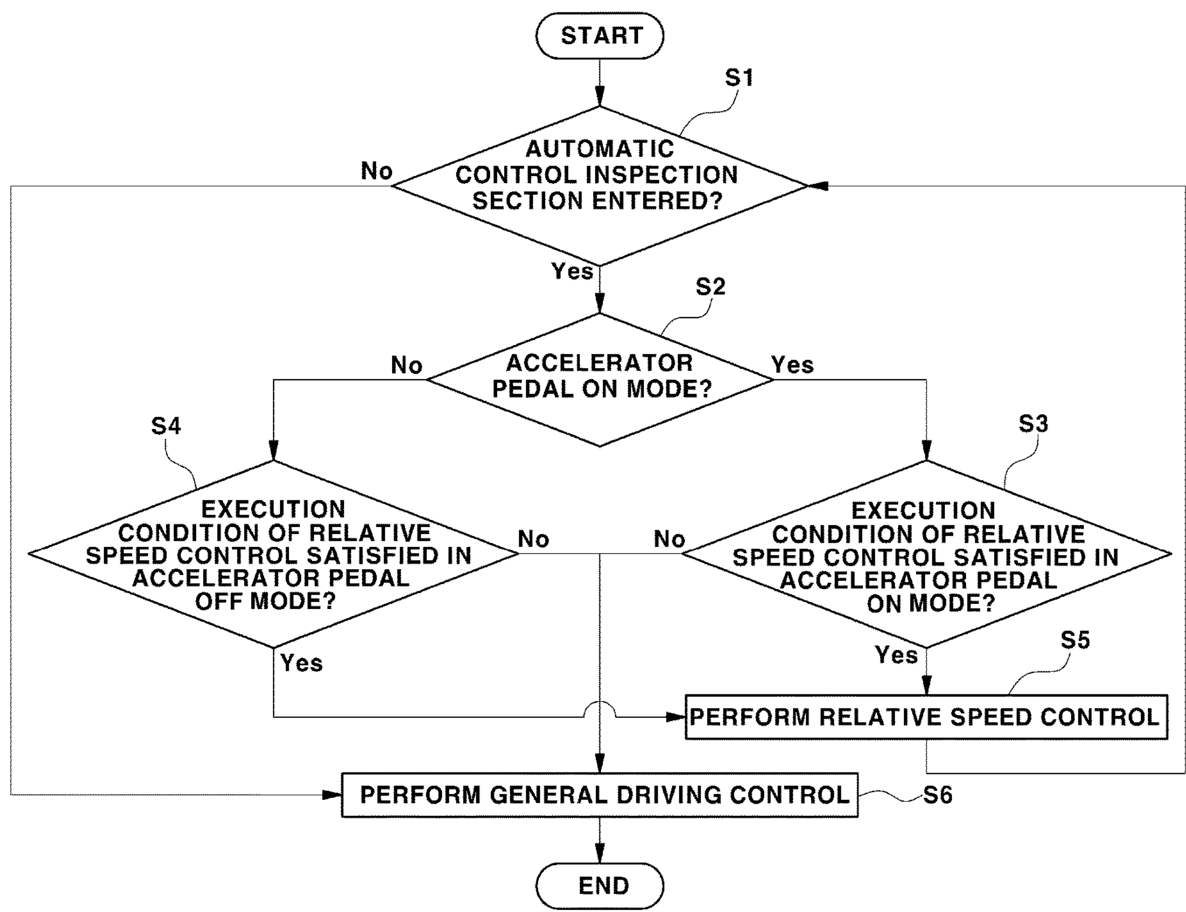
FIG. 12 is a flowchart illustrating a control process for one-pedal driving assistance according to an embodiment.

FIG. 12 is a flowchart illustrating a control process for one-pedal driving assistance and a control process of the present invention will be summarized with reference thereto in accordance with an embodiment.

First, the controller determines whether the vehicle has entered the automatic control inspection section (S1), and upon determining that the vehicle has entered the automatic control inspection section, the controller determines whether the accelerator pedal on mode is entered or the accelerator pedal off mode is entered (S2). When the vehicle has not entered the automatic control inspection section, the controller performs general driving control (S6).

Then, after entering the accelerator pedal on mode or entering the accelerator pedal off mode, whether a determined execution condition of relative speed control is satisfied and a control start time are determined (S3 and S4). When the execution condition is satisfied, relative speed control is performed (S5).

In this way, it is possible to enhance convenience and utilization of one-pedal driving and reduce burden on an ankle during one-pedal driving by automatically maintaining a distance to a vehicle ahead at a predetermined distance using a front sensor while an electrified vehicle is driven using one-pedal driving in a congested section.

Accordingly, using the embodiment method of controlling the vehicle, it is possible to enhance convenience and utilization of one-pedal driving and reduce burden on an ankle during one-pedal driving by automatically maintaining a distance to a vehicle ahead at a predetermined distance using a front sensor while an electrified vehicle is driven using one-pedal driving in a congested section.

Although embodiments of the present invention have been described in detail above, the scope of the present invention is not limited thereto, and various modifications and improvements made by those skilled in the art using the basic concept of the present invention as defined in the following claims are included in the scope of the present invention.

What is claimed is:

1. A method of controlling a subject vehicle for one-pedal driving assistance, the method comprising:

acquiring, by a controller, real-time driving information of the subject vehicle detected by a driving information detection unit and real-time vehicle-ahead information detected by a front detection unit;

determining, by the controller, whether the subject vehicle has entered an automatic control inspection section using relative distance information with respect to a vehicle ahead in the acquired real-time vehicle-ahead information;

starting, by the controller, an automatic distance control mode upon determining that the subject vehicle has entered the automatic control inspection section; and controlling, by the controller, a relative speed with respect to the vehicle ahead by controlling an operation of a driving device for driving the subject vehicle so that a relative distance with respect to the vehicle ahead is adjusted to a target relative distance with respect to the vehicle ahead based on the real-time driving information and the real-time vehicle-ahead information during the automatic distance control mode, wherein the target relative distance is a predetermined constant distance set by a driver of the subject vehicle via an input device, and controlling comprises automatically maintaining the target relative distance between the subject vehicle and the vehicle ahead, wherein:

the automatic distance control mode includes an accelerator pedal off mode and an accelerator pedal on mode, the accelerator pedal off mode is a mode in which the subject vehicle stops at the target relative distance with respect to the vehicle ahead by automatically controlling a speed of the subject vehicle and generating a motor torque of the subject vehicle while the driver completely releases the accelerator pedal within an automatic distance control mode entry distance before the subject vehicle reaches the target relative distance to be maintained with respect to the vehicle ahead, and the accelerator pedal on mode is a mode in which the subject vehicle stops at the target relative distance with respect to the vehicle ahead by controlling the speed of the subject vehicle and generating the motor torque of the subject vehicle in response to the driver depressing the accelerator pedal within the automatic distance control mode entry distance before the subject vehicle reaches the target relative distance to be maintained with respect to the vehicle ahead.

2. The method of claim 1, wherein the automatic control inspection section is defined, in the controller, as a section from a position where a distance to the vehicle ahead is a maximum relative distance set through the input device by the driver to the vehicle ahead.

3. The method of claim 1, wherein the input device is connected to the controller.

4. The method of claim 1, wherein the controlling includes:

determining a target motor torque for controlling the relative speed with respect to the vehicle ahead;

generating a motor torque command for generating the determined target motor torque; and controlling an operation of a motor serving as the driving device according to the generated motor torque command.

5. The method of claim 4, wherein:

after starting of the automatic distance control mode, when the controller determines that an accelerator pedal is in an on state when the subject vehicle enters the automatic control inspection section from an accelerator pedal input value in the real-time driving information, the accelerator pedal on mode in the automatic distance control mode starts; and in the determining of the target motor torque, the controller determines the target motor torque for controlling the relative speed in the accelerator pedal on mode.

6. The method of claim 5, wherein the controller is configured to control the relative speed upon satisfying a condition that the relative distance with respect to the vehicle ahead in the real-time vehicle-ahead information is less than or equal to a control start relative distance during the accelerator pedal on mode.

7. The method of claim 6, wherein:

the control start relative distance is determined as a distance of the automatic control inspection section or is calculated using the target relative distance and a minimum travel distance of the subject vehicle; and the minimum travel distance of the subject vehicle is defined as a distance by which the subject vehicle kinematically travels when the subject vehicle is decelerated by maximum motor torque, and the minimum travel distance is obtained using a vehicle speed which is one piece of the real-time driving information or is obtained using road surface resistance torque estimated using the vehicle speed, and a maximum deceleration torque limit of the motor.

8. The method of claim 4, wherein:

in the starting of the automatic distance control mode, when the controller determines that the accelerator pedal is in an off state when the subject vehicle enters the automatic control inspection section from an accelerator pedal input value in the real-time driving information, the accelerator pedal off mode in the automatic distance control mode starts; and in the determining of the target motor torque, the controller determines the target motor torque for controlling the relative speed in the accelerator pedal off mode.

9. The method of claim 8, wherein the controller is configured to control the relative speed according to the target relative distance and the relative distance with respect to the vehicle ahead in the real-time vehicle-ahead information during the accelerator pedal off mode.

10. The method of claim 9, wherein the controller is configured to:

control the relative speed immediately after entering the accelerator pedal off mode when a value obtained by subtracting the target relative distance from the relative distance with respect to the vehicle ahead is less than a maximum travel distance of the subject vehicle; and control the relative speed when a vehicle speed of the subject vehicle becomes less than or equal to a set vehicle speed limit without applying motor torque to the vehicle when the value obtained by subtracting the target relative distance from the relative distance with respect to the vehicle ahead is greater than or equal to the maximum travel distance of the subject vehicle.

11. The method of claim 10, wherein the maximum travel distance of the subject vehicle is defined as a maximum travel distance by which the subject vehicle is allowed to move while decelerating by road surface resistance torque when motor torque is not applied to the subject vehicle, and the maximum travel distance is obtained using the relative speed with respect to the vehicle ahead when entering the accelerator pedal off mode or obtained using road surface resistance torque estimated using the relative speed with respect to the vehicle ahead when entering the accelerator pedal off mode.

12. The method of claim 4, wherein the determining of the target motor torque includes:

determining a target relative speed with respect to the vehicle ahead using the real-time vehicle-ahead information; and using the determined target relative speed with respect to the vehicle ahead and an actual relative speed with respect to the vehicle ahead in the real-time vehicle-ahead information to determine a target motor torque for adjusting the actual relative speed with respect to the vehicle ahead to the target relative speed.

13. The method of claim 12, wherein the determining of the target relative speed with respect to the vehicle ahead includes determining the target relative speed with respect to the vehicle ahead using a formula or a map determined from the relative distance with respect to the vehicle ahead in the real-time vehicle-ahead information.

14. The method of claim 13, wherein the target relative speed is determined from the formula:

$$v_{rel.target} = \begin{cases} a_{rel.target}\sqrt{2a_{rel.target}(s - s_{target})} & (s < s_{target}) \\ 0 & (s \geq s_{target}) \end{cases},$$

where $v_{rel.target}$, $a_{rel.target}$, s, and $s_{target}$ respectively denote the target relative speed with respect to the vehicle ahead, target relative acceleration, the relative distance with respect to the vehicle ahead, and a target relative distance, respectively, and the target relative acceleration is a preset tuning variable.

15. The method of claim 13, wherein the target relative speed is determined from the formula:

$$v_{rel.target} = \begin{cases} \frac{v_{rel.in}}{s_{on.start} - s_{target}}(s - s_{target}) & (s < s_{target}) \\ 0 & (s \geq s_{target}) \end{cases}$$

where $v_{rel.target}$, $v_{rel.in}$, s, $s_{on.start}$, and $s_{target}$ respectively denote the target relative speed with respect to the vehicle ahead, a vehicle speed of the subject vehicle when the relative speed starts to be controlled, the relative distance with respect to the vehicle ahead, a determined control start relative distance, and the target relative distance, respectively.

16. The method of claim 12, wherein, in the determining of the target motor torque, the target motor torque is obtained as a sum of a feedforward control input and feedback control input, and the feedback control input is obtained using an error between the target relative speed and the actual relative speed.

17. The method of claim 16, wherein, in the determining of the target motor torque, the feedforward control input is obtained using road surface resistance torque estimated using information about the target relative speed, a vehicle model, and the actual relative speed.

18. A method of controlling a subject vehicle for one-pedal driving assistance, the method comprising:

acquiring, by a controller, real-time driving information of the subject vehicle detected by a driving information detection unit and real-time vehicle-ahead information detected by a front detection unit;

determining, by the controller, whether the subject vehicle has entered an automatic control inspection section using relative distance information with respect to a vehicle ahead in the acquired real-time vehicle-ahead information;

starting, by the controller, an automatic distance control mode upon determining that the subject vehicle has entered the automatic control inspection section; and controlling, by the controller, a relative speed with respect to the vehicle ahead by controlling an operation of a driving device for driving the subject vehicle so that a relative distance with respect to the vehicle ahead is adjusted to a target relative distance with respect to the vehicle ahead based on the real-time driving information and the real-time vehicle-ahead information during the automatic distance control mode, wherein the controller is set to control the relative speed upon satisfying a condition that a vehicle speed in the real-time driving information is less than or equal to a determined relative speed during the automatic distance control mode, wherein the target relative distance is a predetermined constant distance set by a driver of the subject vehicle via an input device, and controlling comprises automatically maintaining the target relative distance between the subject vehicle and the vehicle ahead, wherein:

the automatic distance control mode includes an accelerator pedal off mode and an accelerator pedal on mode, the accelerator pedal off mode is a mode in which the subject vehicle stops at the target relative distance with respect to the vehicle ahead by automatically controlling a speed of the subject vehicle and generating a motor torque of the subject vehicle while the driver completely releases the accelerator pedal within an automatic distance control mode entry distance before the subject vehicle reaches the target relative distance to be maintained with respect to the vehicle ahead, and the accelerator pedal on mode is a mode in which the subject vehicle stops at the target relative distance with respect to the vehicle ahead by controlling the speed of the subject vehicle and generating the motor torque of the subject vehicle in response to the driver depressing the accelerator pedal within the automatic distance control mode entry distance before the subject vehicle reaches the target relative distance to be maintained with respect to the vehicle ahead.

19. The method of claim 18, wherein the controller is configured to control the relative speed upon satisfying a condition below based on a wheel speed, the vehicle speed in the real-time driving information, and the relative speed with respect to the vehicle ahead in the real-time vehicle-ahead information:

$$|r_w\omega_w + v_{rel}| \leq v_{diff.threshold},$$

where $v_{rel}=v_{front}-v_{veh}$, $v_{veh}=r_w\omega_w$, and $v_{front}$, $v_{veh}$, $r_w$, $\omega_w$, $v_{rel}$, and $v_{diff.threshold}$ respectively denote a vehicle speed of the vehicle ahead, the speed of the subject vehicle, a wheel radius of the subject vehicle, the wheel speed of the subject vehicle, the relative speed with respect to the vehicle ahead, and a predetermined threshold, respectively.

20. The method of claim 19, wherein the controller is configured to control the relative speed upon satisfying a condition that a steering angle in the real-time driving information is less than or equal to a determined steering angle limit.

* * * * *